United States Patent
Chiu et al.

(10) Patent No.: US 8,705,380 B1
(45) Date of Patent: Apr. 22, 2014

(54) METHOD AND APPARATUS FOR DETERMINING PROPER TELEPHONY ADAPTOR CONFIGURATION AND INSTALLATION

(75) Inventors: Vincent Chiu, Aurora, IL (US); Andy Huang, Hoffman Estates, IL (US); David J. Peto, Naperville, IL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1374 days.

(21) Appl. No.: 11/284,104

(22) Filed: Nov. 21, 2005

(51) Int. Cl.
   *H04L 12/26*  (2006.01)

(52) U.S. Cl.
   USPC .......................................................... 370/252

(58) Field of Classification Search
   None
   See application file for complete search history.

(56) References Cited

U.S. PATENT DOCUMENTS

| | | | |
|---|---|---|---|
| 2002/0042687 A1* | 4/2002 | Tracy et al. | 702/119 |
| 2006/0031830 A1* | 2/2006 | Chu et al. | 717/174 |
| 2006/0256721 A1* | 11/2006 | Yarlagadda et al. | 370/235 |
| 2009/0019141 A1* | 1/2009 | Bush et al. | 709/223 |

* cited by examiner

*Primary Examiner* — Luat Phung

(57) ABSTRACT

A method and apparatus for ensuring an Internet Protocol (IP) service supported telephony adaptor (TA) is correctly installed and connected into the network for VoIP service usage are disclosed. In one embodiment, the present invention identifies the TA as one that is supported by the VoIP service, and identifies the correct network configuration topography, e.g., the location of the TA in the user's network.

15 Claims, 6 Drawing Sheets

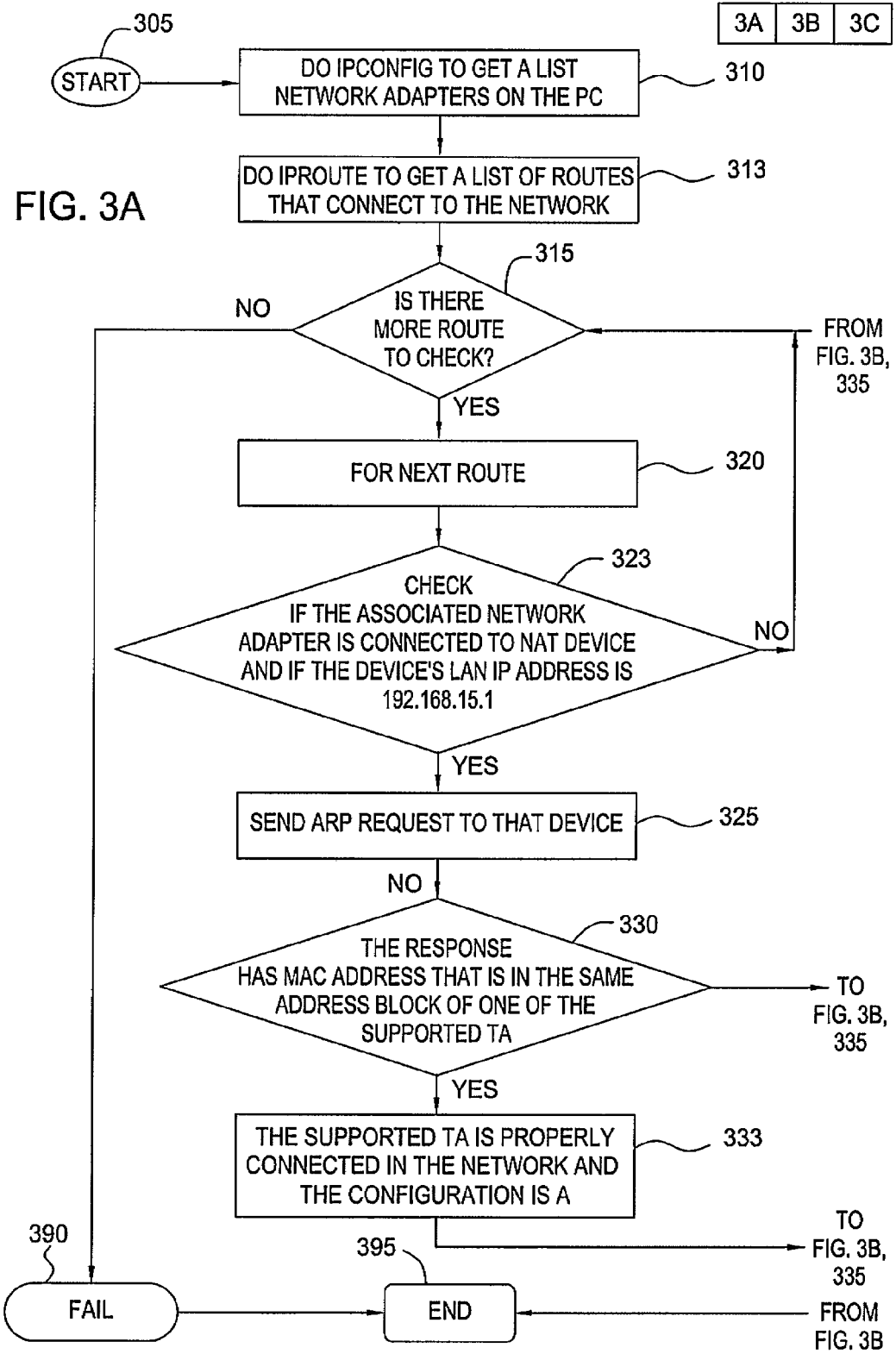

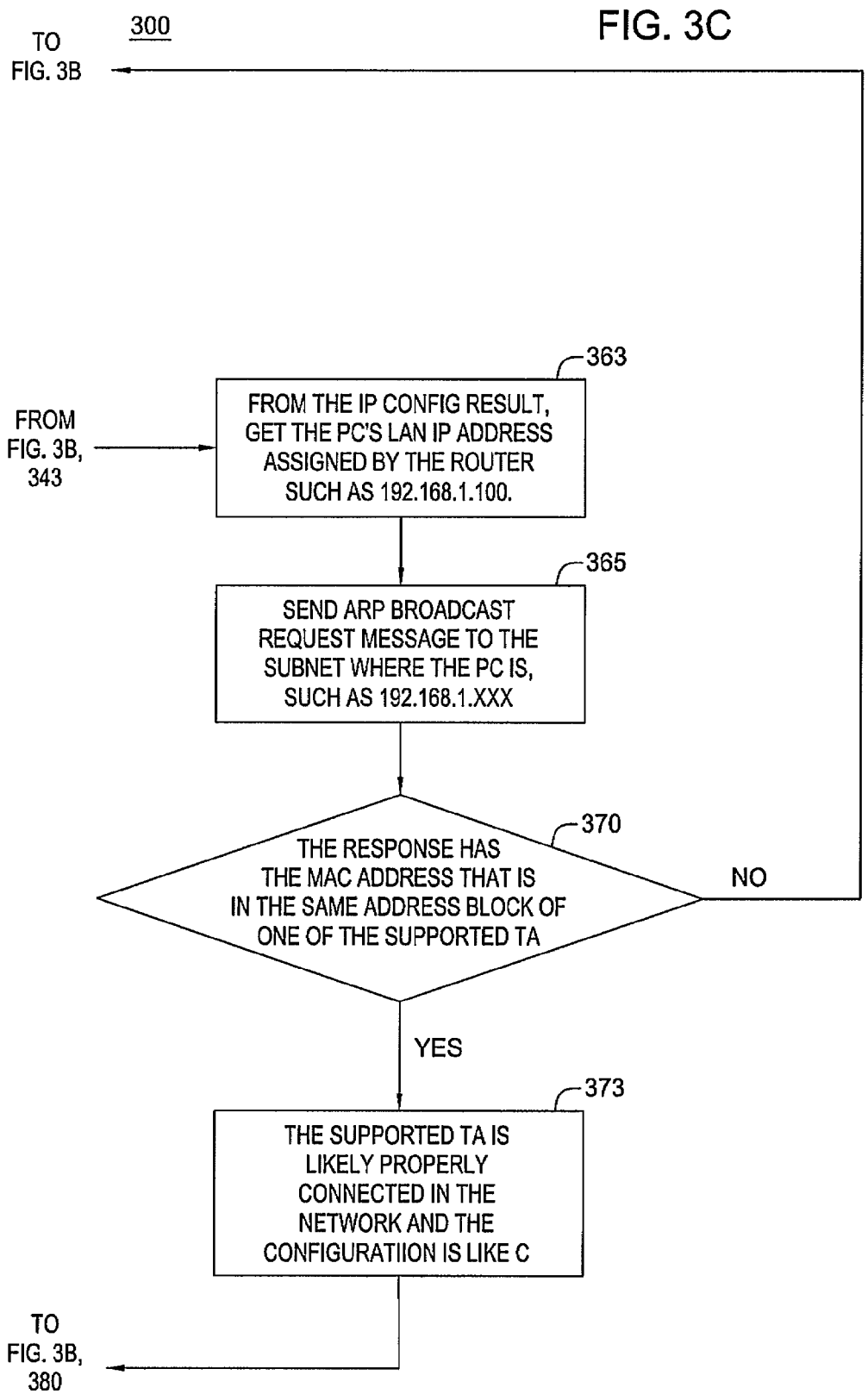

METHOD AND APPARATUS FOR DETERMINING PROPER TELEPHONY ADAPTOR CONFIGURATION AND INSTALLATION

The present invention relates generally to communication networks and, more particularly, to a method and apparatus for enabling proper telephony adaptor configuration and installation in packet networks, e.g., Voice over Internet Protocol (VoIP) networks.

BACKGROUND OF THE INVENTION

Very often, it is difficult for a VoIP subscriber to ensure the VoIP service supported Telephony Adapter (TA) is correctly installed and connected into the network configuration for VoIP usage. For normal user, especially the user that has home-networking, it will be difficult for the user to install and connect the TA into the network correctly. When the user is having problem connecting to the network due to improper installation and configuration, a customer representative has to work with the user to step the user through the installation process step by step to determine if the installation and configuration performed by the user have been performed properly. This takes a great deal of time and resources from the network provider's point of view and may also cause a great deal of frustration from the user's point of view. There is no automated way to determine if the TA is correctly installed or connected into the network so that user can be instructed to do it correctly.

Therefore, a need exists for a method and apparatus for enabling proper telephony adaptor configurations and installations in packet networks, e.g., VoIP networks.

SUMMARY OF THE INVENTION

In one embodiment, the present invention is a method that ensures a packet network service, e.g., a VoIP service, supported TA is correctly installed and connected into the network for VoIP service usage. For example, the present invention identifies the TA as one that is supported by the VoIP service and identifies the correct network configuration topography, e.g., the location of the TA in the user's network.

Specifically, the present invention enables the network to determine and identify the supported TA on the network and determine if the network configuration of the installed and connected TA is correct. The present invention may run on a Personal Computer (PC) that is connected to the same home network of the user. Thus, this is particularly useful for users with home network, such as a router that is used in the home network. There are several different methods that can be employed to install and connect the TA into the network. The present method will determine if the supported TA is correctly installed and connected to the network and will also determine which method was used to install and connect the supported TA. In one embodiment, the method makes use of: Network Address Translation (NAT), Address Resolution Protocol (ARP), Individual Address Block (IAB) for Media Access Control (MAC) address of the TA, and/or default or industry standard TA's LAN IP address which is typically 192.168.15.1, to determine whether a TA connected within a home network, is a supported TA type and whether the TA is installed and connected properly.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
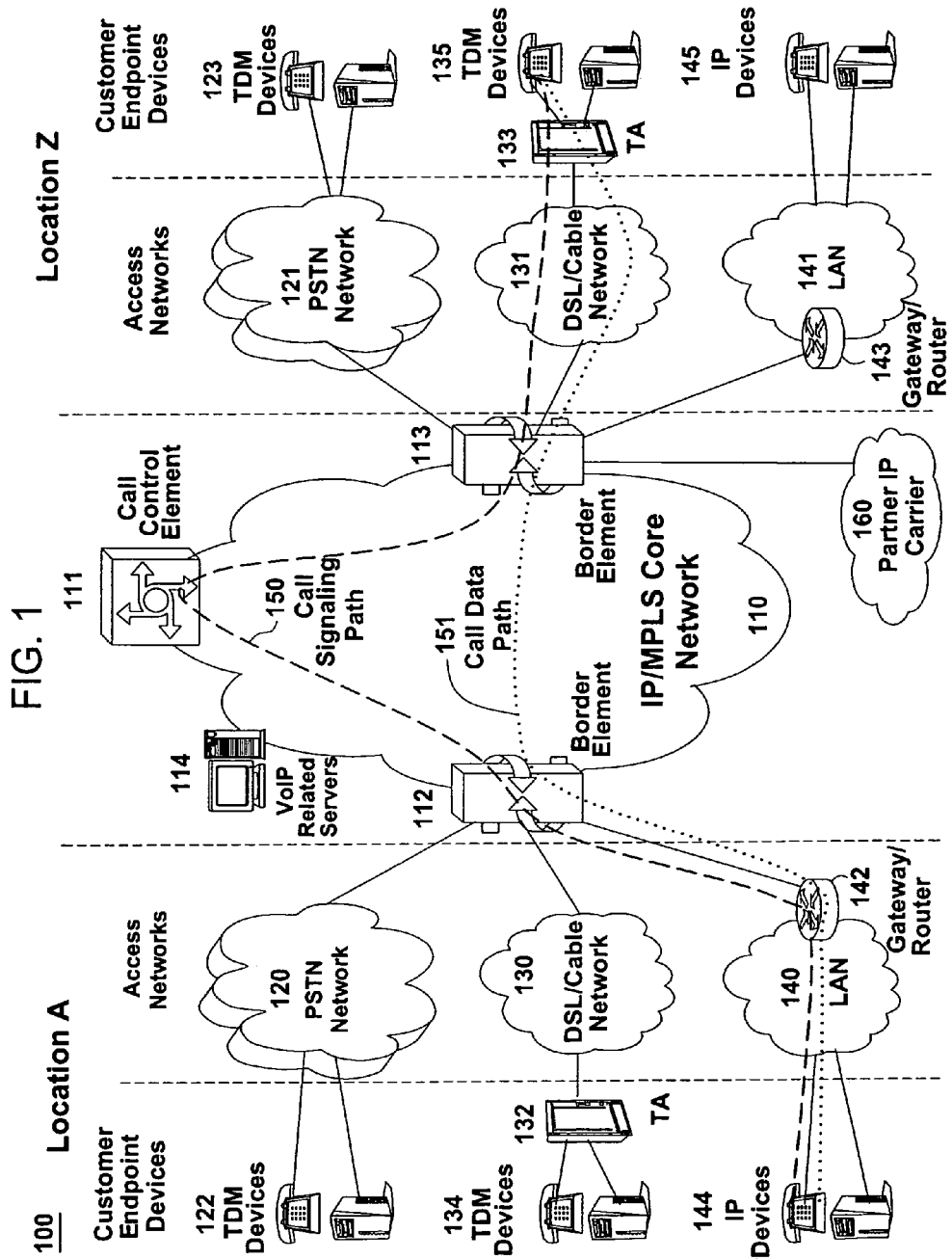
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Telephony Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Very often, it is difficult for a VoIP subscriber to ensure the VoIP service supported Telephony Adapter (TA) is correctly installed and connected into the network configuration for VoIP usage. For normal user, especially the user that has home-networking, it will be difficult for the user to install and connect the TA into the network correctly. When the user is having problem connecting to the network due to improper installation and configuration, a customer representative has to work with the user to step the user through the installation process step by step to determine if the installation and configuration performed by the user have been performed properly. This takes a great deal of time and resources from the network provider's point of view and may also cause a great deal of frustration from the user's point of view. There is no automated way to determine if the TA is correctly installed or connected into the network so that the user can be instructed to do it correctly.

To address this criticality, the present invention is a method that ensures the packet network service, e.g., VoIP service supported TA is correctly installed and connected into the network for VoIP service usage. In one embodiment, the present invention identifies the TA as one that is supported by the VoIP service and identifies the correct network configuration topography, e.g., the location of the TA in the user's network.

The present invention enables the network to determine and identify the supported TA on the network and to determine if the network configuration of the installed and connected TA is correct. This is particularly useful for users with home network, such as a router that is used in the home network. There are several different methods that can be employed to install and connect the TA into the network. The present method will determine if the supported TA is correctly installed and connected to the network and will also determine which method was used to install and connect the supported TA. In one embodiment, the method makes use of: Network Address Translation (NAT), Address Resolution Protocol (ARP), Individual Address Block (IAB) for Media Access Control (MAC) address of the TA, and/or default or industry standard TA's LAN IP address which is typically 192.168.15.1, to determine whether a TA connected within a home network, is a supported TA type and whether the TA is installed and connected properly.

The present invention may run on a PC that is connected to the same home network. The present invention also enables the filtering of non-VoIP service supported NAT devices and the handling of TA as a subnet node in the home network where the PC resides.

Figure 2:
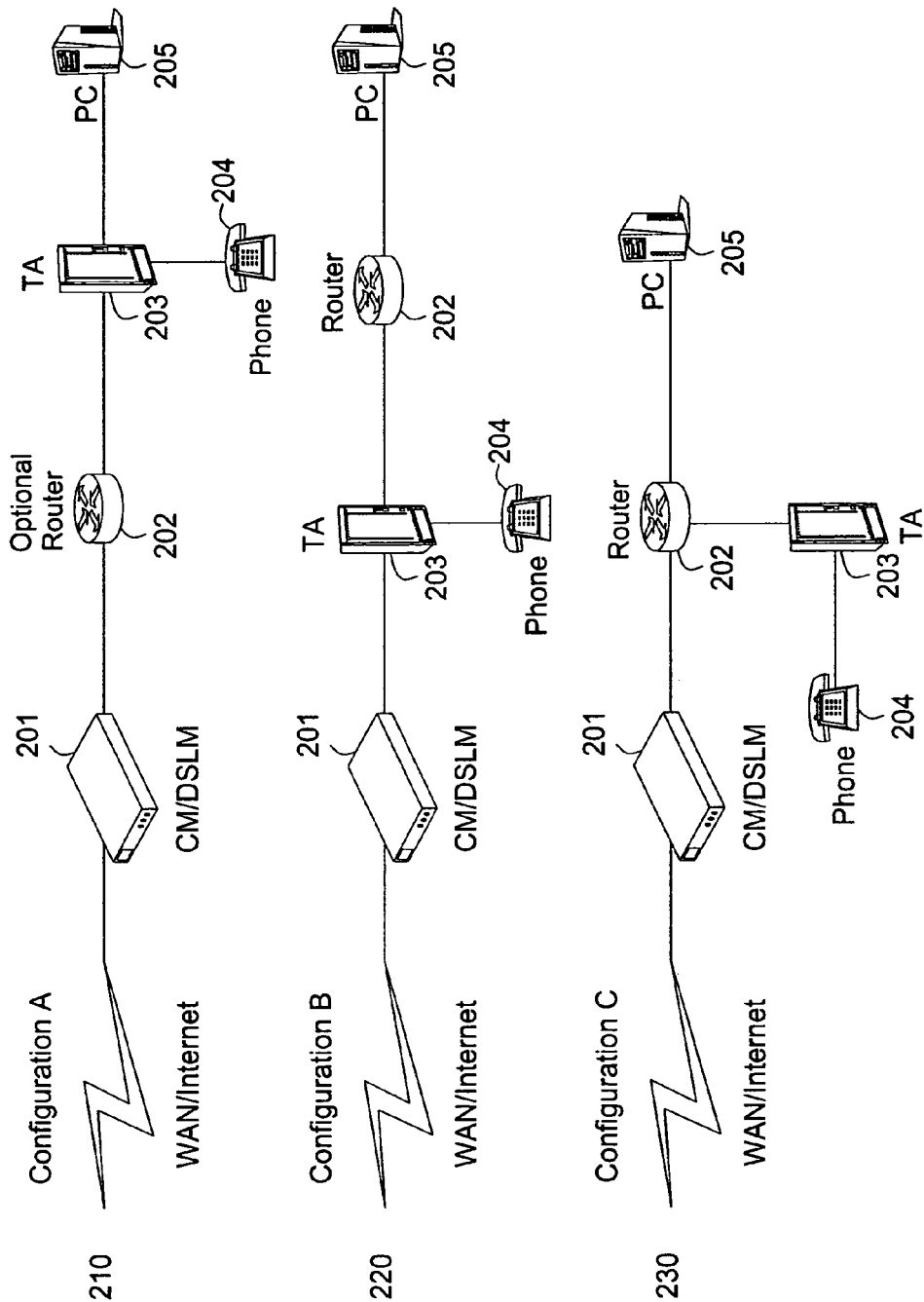
FIG. 2 illustrates an example of possible exemplary configurations of Telephony Adaptor supporting VoIP services in a VoIP network of the present invention.

FIG. 2 illustrates a set 200 of exemplary configurations of Telephony Adaptor supporting services in a packet network, e.g., a VoIP network, related to the present invention. Configurations 210, 220, and 230 are allowed or approved configurations of how a TA can be installed within a home LAN and connected to a VoIP network. Cable Modem or Digital Subscriber Loop Modem (CM/DSLM) 201 (broadly defined as a broadband Modem) is used to connect the end user's home LAN to the broadband access networks, such as a Cable access network or a Digital Subscriber Loop (DSL) access network, to gain access to the Internet. Router 202 is used to provide functions including, but is not limited to, NAT and firewall features between the broadband access network and the end user home LAN. TA 203 is used to provide necessary interworking functions between TDM customer endpoint devices, such as analog phone 204, and packet based network technologies. PC 205 is a personal computer which is on a home LAN owned and operated by the end user to access the internet.

In configuration 210, the broadband access network is connected via CM/DSLM 201. CM/DSLM 201 is connected, optionally, to router 202. Router 202 is connected to TA 203 if router 202 is present; otherwise, CM/DSLM 201 is connected directly to TA 203. TA 203 is connected to CM/DSLM 201, or Router 202 if present, using its Wide Area Network (WAN) port, to PC 205 using its Local Area Network (LAN) port, and to Phone 204 using an analog voice port.

In configuration 220, the broadband access network is connected via CM/DSLM 201. CM/DSLM 201 is connected to TA 203. TA 203 is connected to CM/DSLM 201 using its WAN port, to router 202 using its LAN port, and to Phone 204 using an analog voice port. Router 202 is connected to PC 205. Note that PC 205 can be one of many PCs connected to router 202 within the end user home LAN.

In configuration 230, the broadband access network is connected via CM/DSLM 201. CM/DSLM 201 is connected to router 202. Router 202 is connected to PC 205 and TA 203. TA 203 is connected to router 202 using its WAN port and to Phone 204 using an analog voice port. In this scenario, TA 203 either is not equipped with a LAN port or the LAN port is not used. Note that PC 205 can be one of many PCs connected to router 202 within the end user home LAN.

Broadly defined, a WAN port of a device refers to a network port that is used to connect toward the broadband access network and a LAN port of a device refers to a network port that is used to connect toward the LAN side of the home network. A network port, in one embodiment of the present invention, is an Ethernet port running at 10 Mbps, 100 Mbps, or 1 Gbps.

Figure 3B:
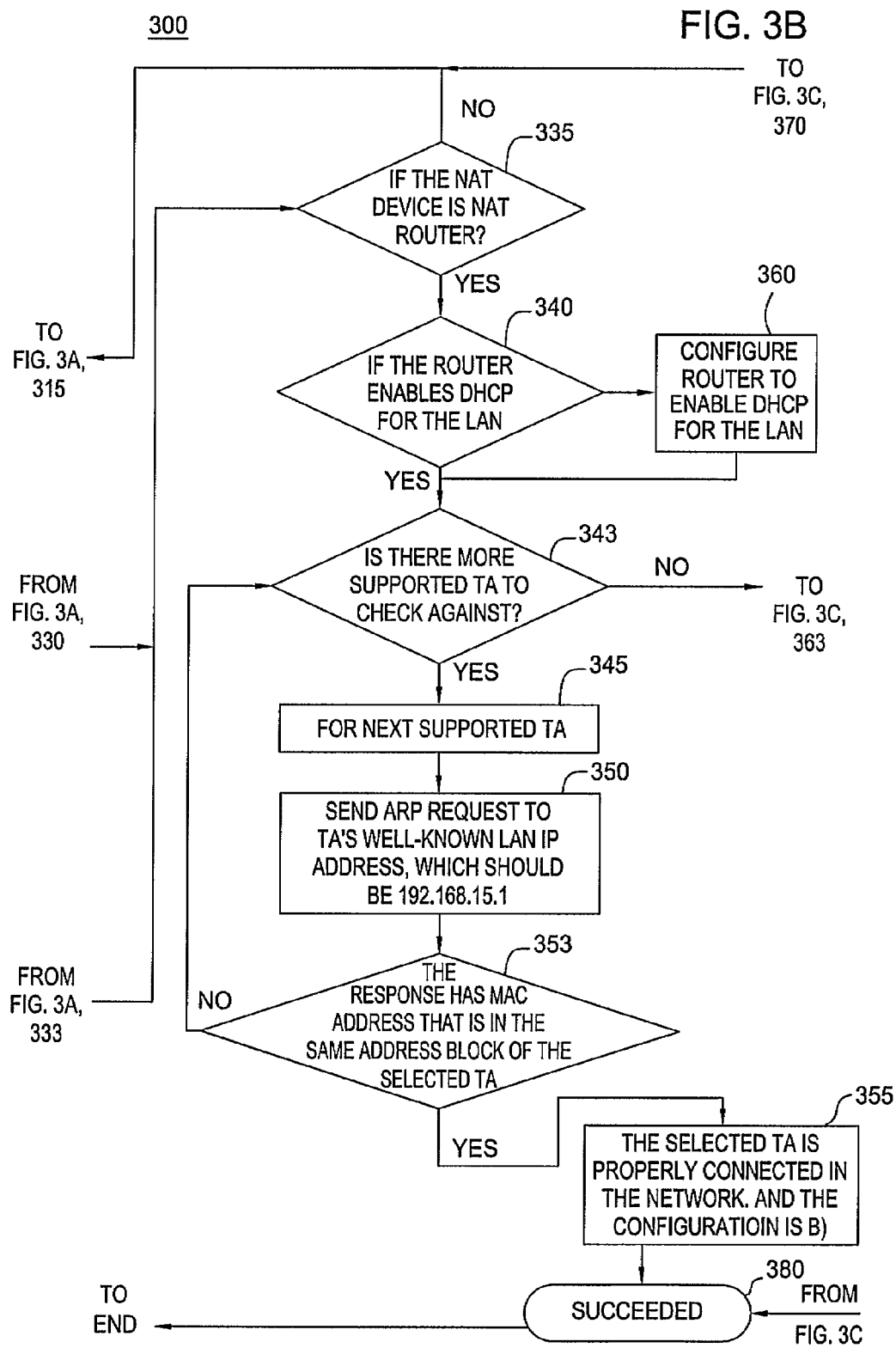
FIG. 3 illustrates a flowchart of a method for determining proper telephony adaptor configurations and installations in a VoIP network of the present invention.

FIG. 3 illustrates a flowchart of a method 300 for determining proper telephony adaptor configuration and installation from a PC connected to a home network as part of a VoIP network. Method 300 starts in step 305 and proceeds to step 310.

In step 310, the method obtains a listing of all the Network Adapter or Network Interface Cards (NIC) that a PC has. For example, a command line tool such as "IPConfig" can be used to obtain such a listing on a computer operating with Microsoft Windows of Redmond, Wash.

In step 313, the method obtains all the routes from a routing table on the operating system, such as Windows. For example, a command line tool such as "IPRoute" can be used to obtain such a listing. The routing table stores information about IP networks and how they can be reached. Extract all the default routes from the routing table. The default route is used to connect to a LAN by the PC.

In step 315, the method checks if there is any more default routes to check. If there is no more default route to check, then the method proceeds to step 390; otherwise, the method proceeds to step 320.

In step 320, the method checks the next default route.

In step 323, the method checks if the associated network adapter is connected to a NAT device and if the NAT device's LAN IP address is the TA's default LAN IP address 192.168.15.1. A NAT device can be inferred if the LAN IP subnet uses private IP addresses. The Internet Engineering Task Force (IETF) has defined three classes of private IP address to be used internally within a private IP network. Class "A" private IP addresses range from 10.0.0.0 to 10.255.255.255; class "B" private IP addresses range from 172.16.0.0 to 172.31.255.255; class "C" private IP addresses range from 192.168.0.0 192.168.255.255. Note that the default LAN IP address of a TA can be configured by the TA vendor to a fixed IP address for ease of management from the network provider's point of view. For instance, a network provider may require all certified and supported TAs to be used in its VoIP network to have the same default LAN IP address as a clue to identify if an installed TA is indeed a certified and supported TA. In one embodiment, the default LAN IP address of certified and supported TAs all have LAN IP address of 192.168.15.1. If the associated network adapter is connected to a NAT device and if the device's LAN IP address is the TA's default LAN IP address 192.168.15.1, then the method proceeds to step 325; otherwise, the method proceeds back to step 315.

In step 325, the method sends an ARP request to that device.

In step 330, the method checks if the ARP response returns a node address, e.g., a MAC address, that has the same address block as one of the supported TA types by comparing the first three bytes of the returned MAC address against the first three bytes of all MAC address of all supported TA types. If the returned MAC address is a supported TA device type, the method proceeds to step 333; otherwise, the method proceeds to step 335.

In step 333, the method determines that the supported TA is properly connected within the home network and the configuration is 210 as shown in FIG. 2.

In step 335, the method checks if the NAT device is a NAT router. If the NAT device is a NAT router, the method proceeds to step 340; otherwise, the method proceeds back to step 315.

In step 340, the method checks if the Dynamic Host Configuration Protocol (DHCP) function is enabled by the router for the home network. DHCP is a protocol that dynamically assigns IP addresses to devices connected to a home network. If DHCP is enabled, the method proceeds to step 343; otherwise, the method proceeds to step 360.

In step 343, the method checks if there is any more supported TA types in the home network to be processed. Note that certified and supported TAs can be supplied by multiple vendors to whom different MAC address blocks have been assigned by the IEEE; hence, there are multiple supported TA types to be checked. If there is more supported TA type to be checked, the method proceeds to step 345; otherwise, the method proceeds to step 363.

In step 345, the method identifies the next supported TA type in the home network.

In step 350, the method sends an ARP request to the supported TA's well known IP address which should be 192.168.15.1.

In step 353, the method checks if the ARP response returns a MAC address that has the same address block as that of the selected TA type that is being checked. If the returned MAC address has the same address block as that of the selected TA type, the method proceeds to step 355; otherwise, the method proceeds back to step 343.

In step 355, the method determines that the supported TA is properly connected within the home network and the configuration is 220 as shown in FIG. 2.

In step 360, the method configures the router to enable DHCP function for the home network.

In step 363, the method uses the results returned in step 310 to obtain the IP address of the PC, such as 192.168.1.100, that is associated to the route being processed.

In step 365, the method sends an ARP broadcast request message to the subnet, i.e. address to all network device on the same subnet that shares the same IP prefix 192.168.1.0, within which the PC resides.

In step 370, the method checks if the ARP response returns at least one MAC address that has the same address block as one of the supported TAs in the home network. Note that an ARP broadcast message may generate multiple responses within the subnet depending on the number of network devices residing in that subnet. If at least one of the returned ARP responses contains a MAC address has the same address block as one of the supported TAs in the home network, the method proceeds to step 373; otherwise, the method proceeds back to step 315.

In step 373, the method determines that the supported TA is likely to be connected within the home network and the configuration is likely to be 230 as shown in FIG. 2.

In step 380, the method successfully verifies that the TA installation and connection is correct.

In step 390, the method fails the detection process. The method ends in step 395.

Figure 4:
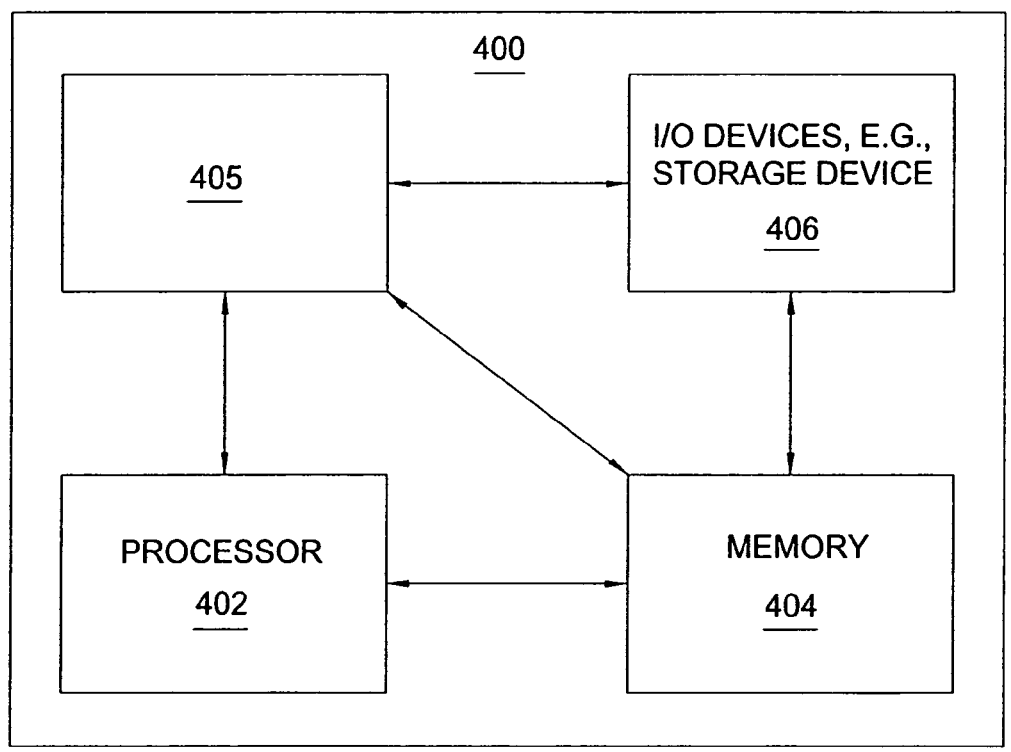
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for enabling proper VoIP Telephony Adaptor configurations and installations, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for enabling proper VoIP Telephony Adaptor configurations and installations can be loaded into memory 404 and executed by processor 402 to implement the functions as discussed above. As such, the present process 405 for enabling proper VoIP Telephony Adaptor configurations and installations (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments; but should be defined only in accordance with the following claims and their equivalents.

What is claimed is:

1. A method for determining an installation of a telephony adaptor for communicating with a communication network, comprising:
    identifying, via a processor of a personal computer connected to a local area network, the telephony adaptor within the local area network, wherein the identifying comprises:
        sending an address resolution protocol request for the telephony adaptor, wherein the sending comprises the personal computer sending the address resolution protocol request to a local area network internet protocol address predefined by a provider of the communication network for the telephony adaptor, wherein the local area network internet protocol address predefined by the provider of the communication network is a configurable parameter that is specified by the provider and set by a manufacturer of the telephony adaptor;
        receiving a node address of the telephony adaptor; and
        comparing the node address to a pre-defined list of node addresses that are supported; and
    determining, via the processor of the personal computer connected to the local area network, the telephony adaptor is installed in accordance with an approved configuration topography for telephony adaptors that is pre-defined within the local area network, wherein the approved configuration topography specifies where the telephony adaptor is located in the local area network and how the telephony adaptor is connected to another device via a port of the another device.

2. The method of claim 1, wherein the communication network is an internet protocol network.

3. The method of claim 1, wherein the node address is a media access control address.

4. The method of claim 1, wherein the approved configuration topography is determined if:
    the personal computer is connected to a network address translation device and the node address is within an approved node address block associated with the telephony adaptor, then the telephony adaptor is configured properly in accordance with one of a plurality of approved configuration topographies.

5. The method of claim 4, wherein the approved configuration topography of the plurality of approved configuration topographies comprises:
    the telephony adaptor is connected to a broadband modem directly or via the network address translation device using a wide area network port of the telephony adaptor and connected to the personal computer using a local area network port of the telephony adaptor.

6. The method of claim 4, wherein the approved configuration topography of the plurality of approved configuration topographies comprises:
    the telephony adaptor is connected to a broadband modem directly using a wide area network port of the telephony adaptor and connected to the network address translation device running a dynamic host control protocol using a local area network port of the telephony adaptor.

7. The method of claim 4, wherein the approved configuration topography of the plurality of approved configuration topographies comprises:
    the telephony adaptor is connected to a broadband modem via the network address translation device running a dynamic host control protocol using a wide area network port of the telephony adaptor to a local area network port of the network address translation device.

8. The method of claim 4, wherein the node address is a media access control address.

9. The method of claim 1, wherein the personal computer is determined to be connected to a network address translation device if the personal computer uses a private local area network internet protocol address.

10. A non-transitory computer-readable medium storing a plurality of instructions which, when executed by a processor of a personal computer connected to a local area network, cause the processor to perform operations for determining an installation of a telephony adaptor for communicating with a communication network, the operations comprising:
    identifying the telephony adaptor within the local area network, wherein the identifying comprises:
        sending an address resolution protocol request for the telephony adaptor, wherein the sending comprises the personal computer sending the address resolution protocol request to a local area network internet protocol address predefined by a provider of the communication network for the telephony adaptor, wherein the local area network internet protocol address predefined by the provider of the communication network is a configurable parameter that is specified by the provider and set by a manufacturer of the telephony adaptor;

receiving a node address of the telephony adaptor and;

comparing the node address to a pre-defined list of node addresses that are supported; and determining the telephony adaptor is installed in accordance with an approved configuration topography for telephony adaptors that is predefined within the local area network, wherein the approved configuration topography specifies where the telephony adaptor is located in the local area network and how the telephony adaptor is connected to another device via a port of the another device.

11. The non-transitory computer-readable medium of claim 10, wherein the communication network is an internet protocol network.

12. The non-transitory computer-readable medium of claim 10, wherein the approved configuration topography is determined if:

the personal computer is connected to a network address translation device and the node address is within an approved node address block associated with the telephony adaptor, then the telephony adaptor is configured properly in accordance with one of a plurality of approved configuration topographies.

13. The non-transitory computer-readable medium of claim 12, wherein a first approved configuration topography of the plurality of approved configuration topographies comprises the telephony adaptor being connected to a broadband modem directly or via the network address translation device using a wide area network port of the telephony adaptor and connected to the personal computer using a local area network port of the supported telephony adaptor;

wherein a second approved configuration topography of the plurality of approved configuration topographies comprises the telephony adaptor is connected to a broadband modem directly using the wide area network port of the supported telephony adaptor and connected to the network address translation device running a dynamic host control protocol using the local area network port of the telephony adaptor; and wherein a third approved configuration topography of the plurality of approved configuration topographies comprises the telephony adaptor is connected to a broadband modem via the network address translation device running a dynamic host control protocol using the wide area network port of the supported telephony adaptor to the local area network port of the network address translation device.

14. The non-transitory computer-readable medium of claim 10, wherein the personal computer is determined to be connected to a network address translation device if the personal computer uses a private local area network internet protocol address.

15. An apparatus for determining an installation of a telephony adaptor for communicating with a communication network, comprising:

a processor of a personal computer connected to a local area network; and a computer-readable medium storing a plurality of instructions which, when executed by the processor, cause the processor to perform operations, the operations comprising:

identifying the telephony adaptor within the local area network, wherein the identifying comprises:

sending an address resolution protocol request for the telephony adaptor, wherein the sending comprises the personal computer sending the address resolution protocol request to a local the communication network for the telephony adaptor, wherein the local area network internet protocol address predefined by the provider of the communication network is a configurable parameter that is specified by the provider and set by a manufacturer of the telephony adaptor;

receiving a node address of the telephony adaptor; and comparing the node address to a pre-defined list of node addresses that are supported; and determining the telephony adaptor is installed in accordance with an approved configuration topography for telephony adaptors that is predefined within the local area network, wherein the approved configuration topography specifies where the telephony adaptor is located in the local area network and how the telephony adaptor is connected to another device via a port of the another device.

* * * * *